United States Patent
Svensson et al.

(10) Patent No.: US 12,485,860 B2
(45) Date of Patent: Dec. 2, 2025

(54) ADAPTIVE NOISE CANCELLATION IN A BRAKE SYSTEM

(71) Applicant: FORD GLOBAL TECHNOLOGIES, LLC, Dearborn, MI (US)

(72) Inventors: Thomas Svensson, Leichlingen (DE); Harold John Felch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 371 days.

(21) Appl. No.: 17/878,448

(22) Filed: Aug. 1, 2022

(65) Prior Publication Data
US 2024/0034289 A1    Feb. 1, 2024

(51) Int. Cl.
*B60T 8/172*    (2006.01)
*B60T 8/171*    (2006.01)
*B60T 17/22*    (2006.01)

(52) U.S. Cl.
CPC .............. *B60T 8/172* (2013.01); *B60T 8/171* (2013.01); *B60T 17/22* (2013.01); *B60T 2250/00* (2013.01); *B60T 2270/406* (2013.01)

(58) Field of Classification Search
CPC .......... B60T 8/172; B60T 8/171; B60T 17/22; B60T 2250/00; B60T 2270/406; B60T 8/173; B60W 30/18109
See application file for complete search history.

(56) References Cited

U.S. PATENT DOCUMENTS

| | | | |
|---|---|---|---|
| 6,050,652 A * | 4/2000 | Kolbe | B60T 8/173 303/191 |
| 2010/0250081 A1* | 9/2010 | Kinser | B60T 8/173 701/70 |

(Continued)

FOREIGN PATENT DOCUMENTS

| | | | |
|---|---|---|---|
| EP | 1792797 B1 * | 12/2013 | B60T 8/00 |
| JP | H09221013 A | 8/1997 | |

(Continued)

OTHER PUBLICATIONS

Swinburne University of Technology, "Destructive Interference", Aug. 30, 2007, http://astronomy.swin.edu.au/cosmos/D/Destructive%2BInterference, Archived by Internet Archive Wayback Machine at https://web.archive.org/web/20070830062629/http://astronomy.swin.edu.au/cosmos/D/Destructive%2BInterference (Year: 2007).*

(Continued)

Primary Examiner — Dale W Hilgendorf
Assistant Examiner — Frank T Glenn, III
(74) Attorney, Agent, or Firm — Burr & Forman; Lorne Forsythe

(57) ABSTRACT

A method of adaptively canceling brake system noise in a vehicle may include monitoring for an occurrence of brake torque stick slip and determining, based on a table of critical parameters associated with brake noise production, when vehicle status information indicates the vehicle is in a critical region for brake noise production. The method may further include, responsive to the occurrence of the brake torque stick slip or the vehicle status information indicating the vehicle is in the critical region for brake noise production, initiating a change to brake force distribution between a front axle and a rear axle of the vehicle, and adaptively updating the table of critical parameters.

20 Claims, 5 Drawing Sheets

(56) References Cited

U.S. PATENT DOCUMENTS

| | | | | |
|---|---|---|---|---|
| 2013/0031318 A1* | 1/2013 | Chen | ............ | G07C 5/00 |
| | | | | 711/E12.001 |
| 2016/0082936 A1* | 3/2016 | Langen | ............ | B60T 13/662 |
| | | | | 701/70 |
| 2018/0065604 A1* | 3/2018 | Matsuno | ............ | B60T 8/175 |
| 2020/0242421 A1* | 7/2020 | Sobhany | ............ | B60H 3/0007 |

FOREIGN PATENT DOCUMENTS

| | | | |
|---|---|---|---|
| JP | 2000344072 A | 12/2000 |
| JP | 2005022501 A | 1/2005 |
| JP | 3951597 B2 | 8/2007 |
| KR | 20190088799 A | 7/2019 |

OTHER PUBLICATIONS

David E. Joyce, "Summary of Trigonometric Identities", Dec. 28, 2019, https://www2.clarku.edu/faculty/djoyce/trig/identities.html, Clark University, Archived by Internet Archive Wayback Machine at https://web.archive.org/web/20191228101023/https://www2.clarku.edu/faculty/djoyce/trig/identities.html (Year: 2019).*

* cited by examiner

US 12,485,860 B2

ADAPTIVE NOISE CANCELLATION IN A BRAKE SYSTEM

TECHNICAL FIELD

Example embodiments generally relate to vehicle control algorithms and, more particularly, relate to a system and method for providing a noise cancellation feature in a brake system.

BACKGROUND

Brake noises may include groans, moans, or squeals that are bothersome to drivers regardless of the cause. To deal with these noises, various hardware countermeasures have been devised throughout the years. However, even these countermeasures have proven to be less than satisfying over time.

Thus, it may be desirable to develop an improved approach for dealing with brake system noise generation.

BRIEF SUMMARY OF SOME EXAMPLES

In accordance with an example embodiment, a vehicle control system for a vehicle may be provided. The system may include a braking torque module operably coupled to one or more wheels of the vehicle to provide braking force or braking torque to the one or more wheels distributed between a front axle and a rear axle of the vehicle, and a noise canceller operably coupled to a sensor network to receive vehicle status information. The noise canceller may be configured for monitoring for an occurrence of brake torque stick slip and determining, based on a table of critical parameters associated with brake noise production, when vehicle status information indicates the vehicle is in a critical region for brake noise production. The noise canceller may also be configured for, responsive to the occurrence of the brake torque stick slip or the vehicle status information indicating the vehicle is in the critical region for brake noise production, initiating a change to brake force distribution between a front axle and a rear axle of the vehicle, and adaptively updating the table of critical parameters.

In another example embodiment, a method of adaptively canceling brake system noise in a vehicle may be provided. The method may include monitoring for an occurrence of brake torque stick slip and determining, based on a table of critical parameters associated with brake noise production, when vehicle status information indicates the vehicle is in a critical region for brake noise production. The method may further include, responsive to the occurrence of the brake torque stick slip or the vehicle status information indicating the vehicle is in the critical region for brake noise production, initiating a change to brake force distribution between a front axle and a rear axle of the vehicle, and adaptively updating the table of critical parameters.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
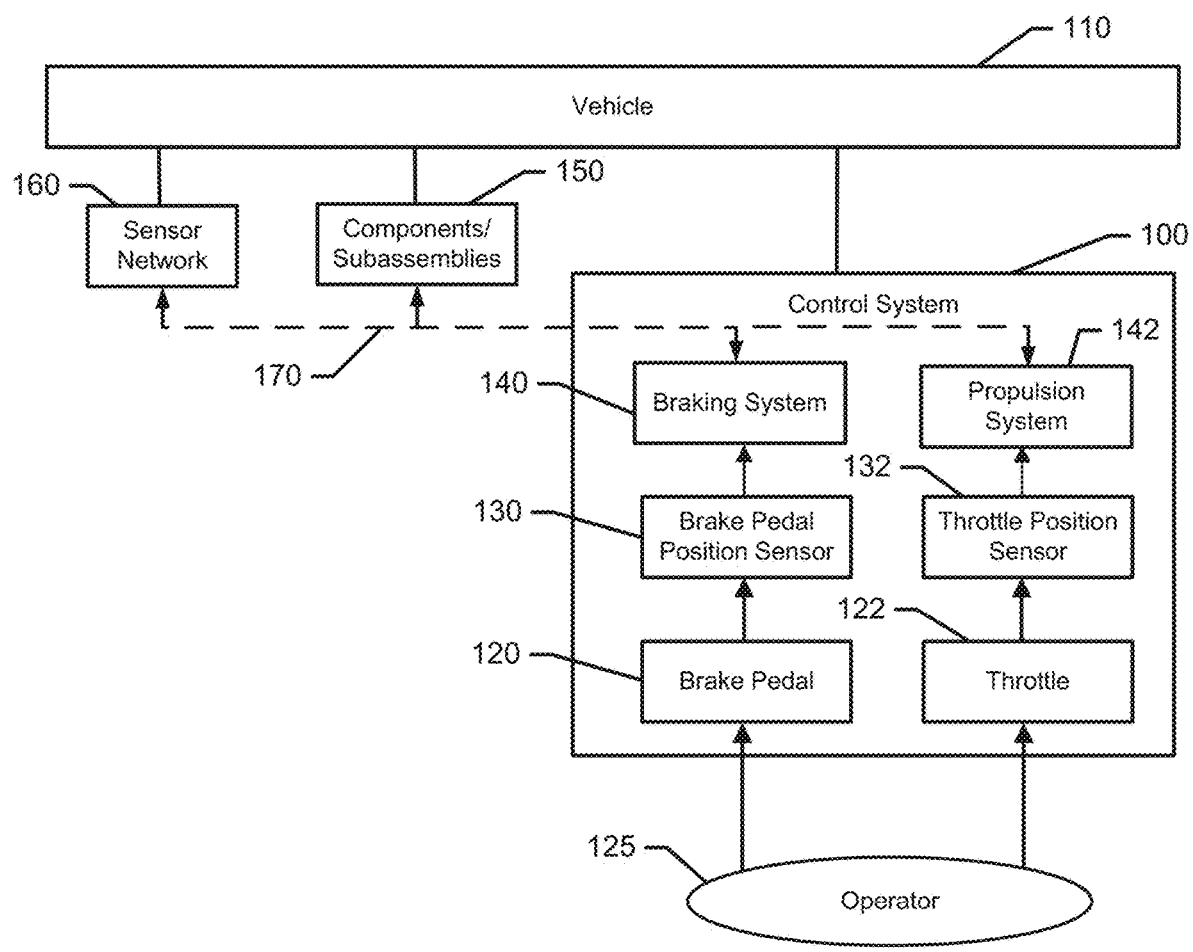
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, it may be desirable to define countermeasures to deal with brake system noise generation. One such countermeasure may be to test for ranges of torque that have a tendency to produce noise or vibration, and then design the brake system to eschew those ranges. However, the actual values of these ranges are extremely likely to change over time and in different operating environments. For example, the ranges may be different for respective different environmental conditions, brake temperatures, vehicle orientations (e.g., on a grade), etc. Thus, a more dynamic and thoughtful approach to defining such countermeasures may be desirable. Example embodiments may provide such an approach.

FIG. 1 illustrates a block diagram of a vehicle control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals. In some embodiments, the control pedals may include a brake pedal 120 and a throttle 122 (or gas pedal). However, the control pedals could alternatively be hand operated or any other operable member via which an operator 125 may provide an input indicative of an intent of the operator relative to controlling net torque for application to the wheels of the vehicle 110. Moreover, some example embodiments may also be practiced in the context of autonomous vehicles. Thus, the control pedals may be completely absent (or temporarily unused) in situations where autonomous control is permanently or temporarily available for the vehicle 110.

The control system 100 may also include position sensors for each of the brake pedal 120 (which may have a corresponding brake pedal position sensor 130) and the throttle 122 (which may have a corresponding throttle position sensor 132). The brake pedal position sensor 130 and the throttle position sensor 132 may provide data indicative of the precise position of the brake pedal 120 and the throttle 122, respectively. The data indicative of pedal position may then be provided to respective ones of the a braking system 140 and a propulsion system 142, which may include components that provide for braking torque application and propulsion torque application, respectively. The braking and propulsion systems 140 and 142 may be configured to determine individual inputs of negative and positive torque (e.g., net torque) as described herein based on inputs from the brake pedal position sensor 130, the throttle position sensor 132, or other components of the vehicle 110. In some cases, the control system 100 may be configured to perform other tasks related or not related to propulsive and braking control or performance management.

In an example embodiment, the control system 100 may receive information that is used to determine vehicle status from various components or subassemblies 150 of the vehicle 110. Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via a vehicle communication bus (e.g., a controller area network (CAN) bus) 170.

The components or subassemblies 150 may include, for example, components of the braking system 140, the propulsion system 142 and/or a wheel assembly of the vehicle 110 among other components/subassemblies. The braking system 140 may be structured to provide braking inputs to braking components of the vehicle 110 (e.g., electro-mechanical brakes, hydraulic brakes, regenerative brakes, etc.) based on a braking torque determined by the torque control module 140. The braking system 140 may also include more than one type of braking hardware. For example, the braking system 140 of the vehicle 110 may include a combination of hydraulic brakes and electro-mechanical brakes. In an example embodiment, the braking system 140 may be a brake-by-wire system and may include an EBB module to facilitate operation of the braking system 140.

The propulsion system 142 may include a gas engine, electric motor, or any other suitable propulsion device. In some cases, the propulsion system 142 may also incorporate drive-by-wire components and a corresponding control paradigm. Thus, the vehicle 110 (using the braking system 140 and the propulsion system 142) may determine either or both of propulsive and braking torque inputs for provision to the propulsion system 142 and braking system 140 to apply the respective form of positive or negative torque to the wheels of the wheel assembly of the vehicle 110. Moreover, one or more corresponding sensors of the sensor network 160 that may be operably coupled to the brake assembly and/or the wheel assembly may provide information relating to brake torque, brake torque rate, vehicle velocity, rate of change of vehicle velocity, front/rear wheel speeds, vehicle pitch, etc.

Accordingly, for example, the control system 100 may be able to receive numerous different parameters, indications and other information that may be related to or indicative of different situations or conditions associated with vehicle status. The control system 100 may also receive information indicative of the intent of the operator 125 (or autonomous control system) relative to control of various aspects of operation of the vehicle 110 and then be configured to use the information received to provide instructions to the braking system 140 and the propulsion system 142 in order to control application of net torque to the wheels of the wheel assembly of the vehicle 110. The control system 100 of FIG. 1 may be similar to conventional systems in many respects, except that, the control system 100 (and in some cases specifically the braking system 140) may be modified to dynamically provide brake noise adaptive cancellation as described in greater detail in reference to FIGS. 2-4.

Figure 2:
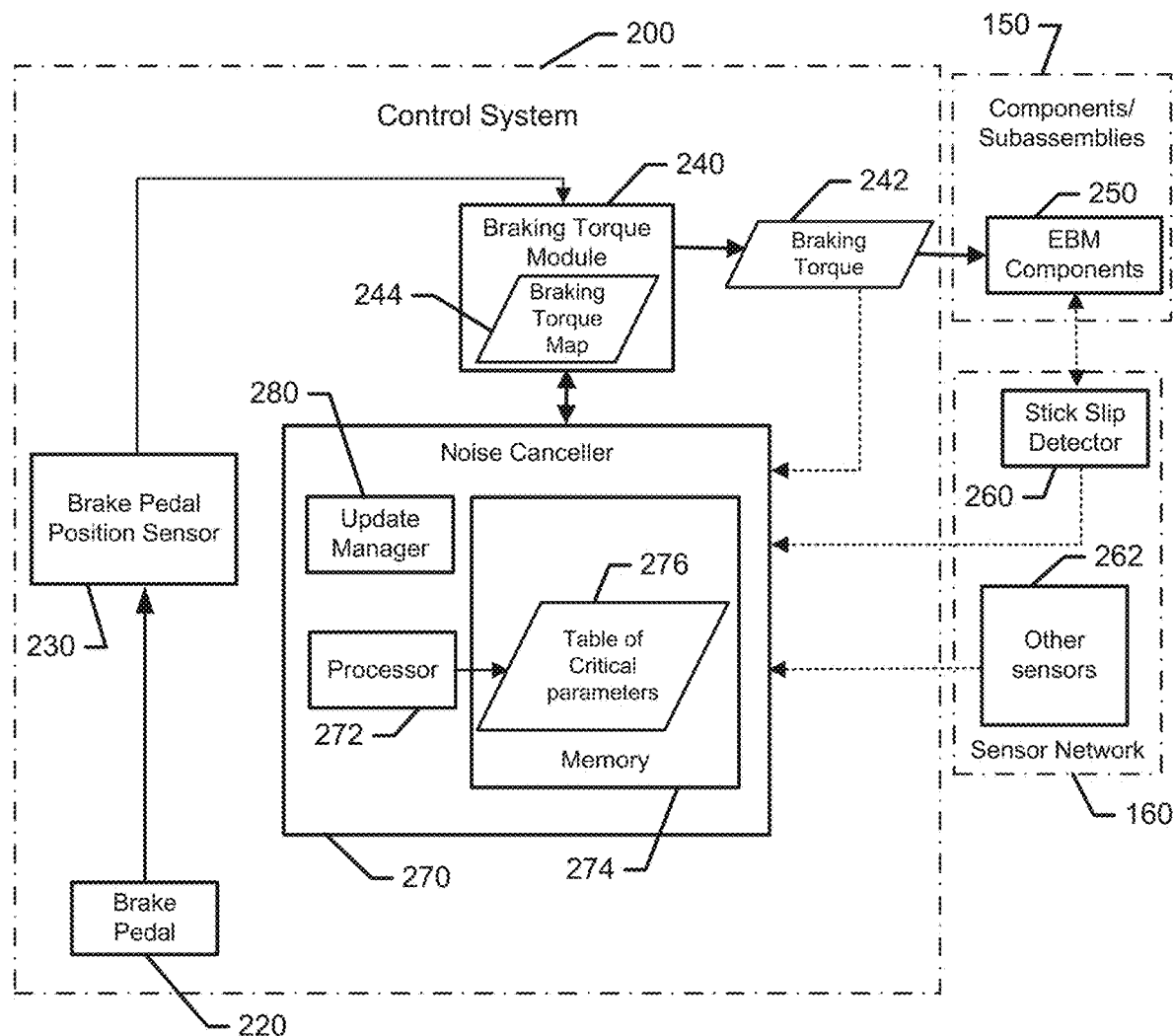
FIG. 2 illustrates a block diagram of some components of the vehicle control system of FIG. 1 in accordance with an example embodiment.

FIG. 2 illustrates a block diagram of various components of a control system 200 (which is a specific example of control system 100 of FIG. 1) in greater detail. In this regard, for example, FIG. 2 illustrates example interactions for the control system 200 between a brake pedal 220 (e.g., an example of brake pedal 120 of FIG. 1), a brake pedal position sensor 230 (e.g., an example of brake pedal position sensor 130 of FIG. 1), a braking torque module 240 (e.g., which generates commands or instructions for braking torque 242) and the components or subassemblies 150 relative to information received thereby (e.g., from the sensor network 160, from various ones of the components/subassemblies 150, and/or from the operator 125).

The control system 200 may include the brake pedal 220, which may have the corresponding brake pedal position sensor 230, to enable the braking torque module 240 to define the requests or commands for braking torque 242 to the braking system 140, which is embodied in this example by an electronic braking module (EBM) and corresponding EBM components 250. The EBM components 250 may include actuators, motors and/or individual braking components of the braking system 140 that are embodied in the form of the EBM. In some embodiments, the control system 200 may receive an input from an operator 125 in the form of a force applied to the brake pedal 220. The control system 200 may then communicate the amount of travel of the corresponding pedal that is caused by the force applied by the operator 125 to the braking torque module 240 in the form of an electronic signal via the brake pedal position sensor 230. In some embodiments, the brake pedal position sensor 230 may include a Hall effect sensor or similar type sensor. The pedal position may then be provided to the braking torque module 240 for use as described in greater detail below. In some embodiments, pedal position may be an example of information indicative of operational intent of the operator 125.

The braking torque module 240 may be configured to receive information indicative of operational intent of the operator 125 (e.g., data from the brake pedal position sensor 230) and, in some cases, also information indicative of vehicle status (e.g., vehicle speed, direction and/or other parameters) from the sensor network 160. Based on the operational intent and/or vehicle status, the braking torque module 240 may determine a braking torque 242 to be applied via the EBM components 250 of the vehicle 110. In other words, braking torque 242 may be considered to be representative of a braking torque request, or a request for a corresponding determined amount of braking torque 242. The braking torque module 240 may determine the braking torque 272 using a braking torque map 244, which may be constructed to balance the information indicative of vehicle status with the information indicative of operational intent of the operator 125 in order to infer the desired braking torque 242 of the operator 125. In an example embodiment, the braking torque map 244 may be generated or otherwise provided by the manufacturer. The braking torque map 244 may be generated based on test data gathered over many hours of testing in numerous different conditions and situations. In some cases, the braking torque map 244 may provide a mapping of brake pedal positions (e.g., as detected by the brake pedal position sensor 230) to corresponding braking torque 242 values to provide to the EBM components 250. Thus, for example, the full range of pedal positions may be mapped to corresponding values of the braking torque 242.

The EBM components 250 may, in some situations, vibrate or make noise in an undesirable way. Detection of such situations may be accomplished via the sensor network 160, which may include a stick slip detector 260 in some cases. The stick slip detector 260 may be configured to detect brake torque stick slip based on measured brake force or measured brake torque. The brake torque stick slip may be experienced as a vibration or oscillation in the measured brake force or measured brake torque. The sensor network 160 may also include other sensors 262 including, for example, any or all of speed sensors, direction sensors, temperature sensors, etc. The stick slip detector 260 and/or the other sensors 262 may communicate their outputs to a noise canceller 270, which may perform adaptive noise cancellation as mentioned above.

In some cases, the braking torque map 244 may define certain regions of braking torque (e.g., critical regions for brake noise) as preferred to eschew in order to minimize brake noise generation. These critical regions may, via testing performed in advance on similar vehicles or braking systems, be regions in which brake torque stick slip has previously been experienced, or is likely to be experienced. However, these critical regions may migrate, expand, contract, appear or disappear over time due to changes in environmental conditions, component life, driving conditions, brake temperatures, etc. To provide dynamic and adaptive noise cancellation that is responsive to current conditions, the control system 200 of example embodiments may include the noise canceller 270 as described herein.

The noise canceller 270 may include processing circuitry (e.g., a processor 272 and memory 274) that is programmable to update and maintain a table of critical parameters 276 associated with brake noise generation. In this regard, for example, the table of critical parameters 276 may be stored in the memory 274, and may be updated (e.g., modified) by the processor 272 according to rules or instructions that may be also stored in the memory 274, or otherwise be accessible to the processor 272. The table of critical parameters 276 may identify the torque or torque ranges where brake torque stick slip has been measured for the vehicle 110. Alternatively or additionally, the table of critical parameters 276 may record the vehicle orientation (e.g., grade or incline of the operating surface), brake temperature, brake torque, vehicle speed, driving direction, etc., that are experienced when vibration/oscillation are experienced at the EBM components 250. Thus, for example, the table of critical parameters 276 may define the torque ranges and/or vehicle conditions that are not to be used by the braking torque map 244, or which are to be omitted thereby.

The table of critical parameters 276 may initially be created based on factory or field testing. However, the table of critical parameters 276 may be updated continuously by the noise canceller 270. In this regard, for example, whenever the stick slip detector 260 or the other sensors 262 sense situations or data that is indicative of the occurrence of brake torque stick slip (as determined by the processor 272), the processor 272 may update the table of critical parameters 276. Thus, by direct measurements including those made in real time and at the wheel brake components themselves, the table of critical parameters 276 can be updated and maintained so that the brake torque map 244 may also be adjusted to reduce the likelihood that the brake torque 242 requested will cause any noise, vibration or oscillation. Moreover, this updating may be accomplished locally and in a timely fashion so that the brake torque 242 is always most likely to be appropriately generated to minimize the chances of generating noise.

Accordingly, example embodiments may effectively provide an updateable instance of the noise canceller 270 in each instance of the vehicle 110 on the road. Thus, each individual vehicle may be enabled to employ machine learning to adaptively update its own noise cancellation capabilities. This provision of individually updated agents for conducting noise cancellation may certainly be advantageous to each and every individual instance of the vehicle 110. However, it may also provide opportunities to learn things proactively in one vehicle, in one area, or under certain conditions, which can be leveraged to the benefit of other vehicles in other areas, or when they experience the same conditions. To make this concept of distributed benefit work, the table of critical parameters 276 may not only merely be updated with the specific vehicle status information, torque ranges and vibration or oscillation phenomenon experienced, but may further store context information in association with such information. The context information may include geographical location, season or time of year, current environmental conditions (e.g., precipitation, road surface, ambient temperature, etc.), vehicle mileage, time in service for individual components, vehicle model, and/or the like. The updates made to the table of critical parameters 276, along with the context information, may then be communicated to the cloud (e.g., to a master table, or master updating agent) for consideration to modify tables in other vehicles based on affinity criteria such as temporal, geographic, or other similar context information that may suggest that information learned at one vehicle could be valuable and useful when applied at another. To provide reporting to the cloud, the control system 200 may include an update manager 280 that is capable of communication with devices external to the vehicle 110.

Figure 3:
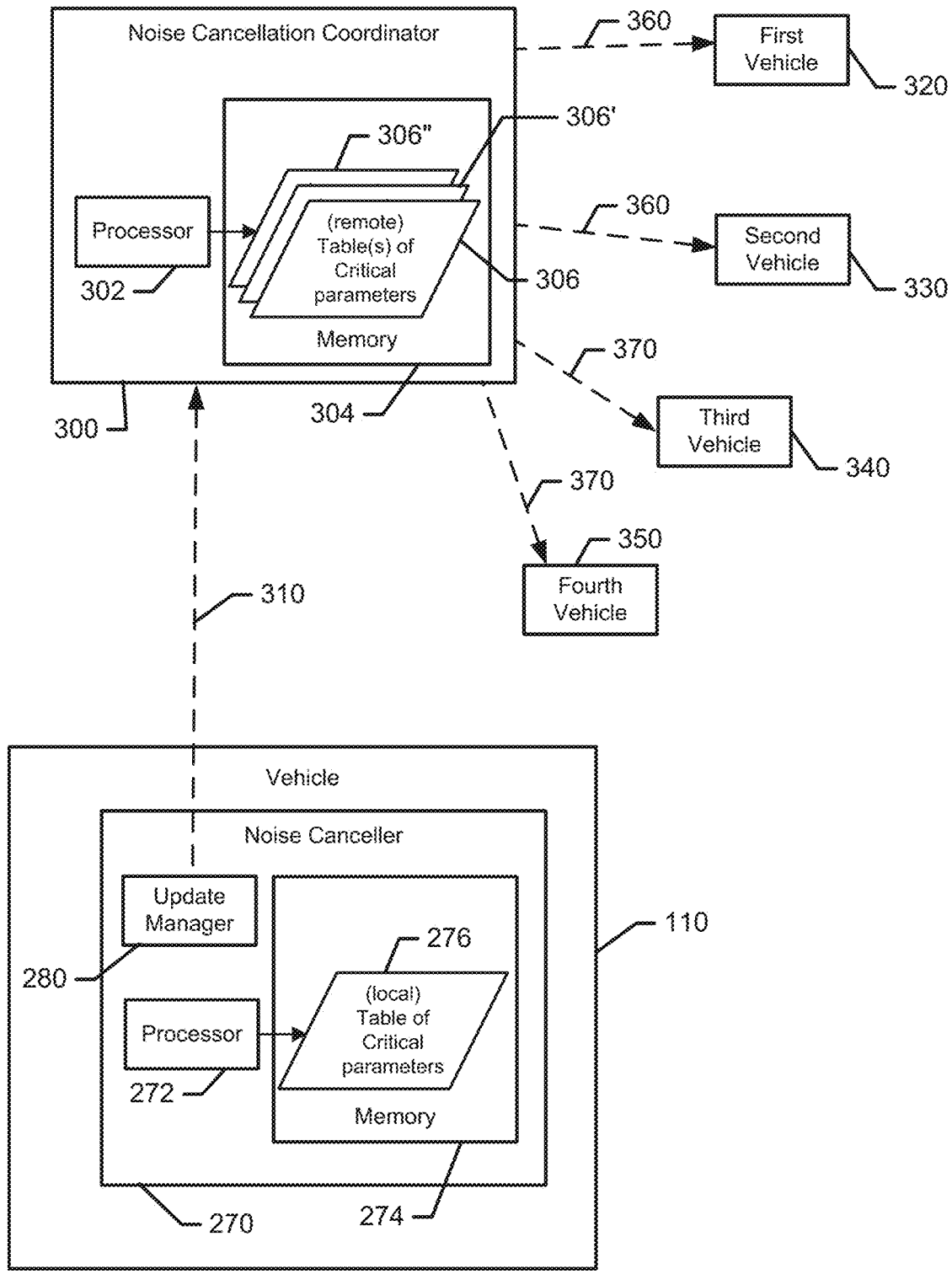
FIG. 3 illustrates a schematic view of external devices to which updates of critical parameters may be provided in accordance with an example embodiment.

FIG. 3 illustrates a block diagram of a network of update managers that may be used for distributed management of adaptive noise cancellation functionality. In this regard, FIG. 3 illustrates the same noise canceller (i.e., noise canceller 270) that was shown in FIG. 2 along with its instance of the update manager 280. The update manager 280 may include an antenna, radio and/or other wireless communication devices that enable copies of either the updates or the entire instance of the table of critical parameters 276 to be communicated off the vehicle 110 and to a noise cancellation coordinator 300, which may be a cloud based asset having the capability to wirelessly receive such updates. Notably, although wireless communication to the cloud is possible in some cases, wired communication is also possible in others. For example, while on the charger, data may be extracted from the vehicle 110, or other wired communication paradigms may be employed.

The noise cancellation coordinator 300 may also be programmed or programmable to manage the intelligent distribution of adaptive noise cancellation strategies and functionalities. Thus, the noise cancellation coordinator 300 may include its own instance of a processor 302 and memory 304 for storing one or more instances of a remote table (or tables) of critical parameters. In the depicted example, multiple instances (three in this case) of remote table (or tables) of critical parameters may be included (e.g., remote tables of critical parameters 306, 306' and 306"). However, in some embodiments, only a single master table may be included to which all updates may be reported.

In examples where multiple remote tables of critical parameters 306, 306' and 306" are employed, each respective one of the tables may have its own affinity group or type association. For example, one table may be provided for each of multiple different respective geographic areas. Additionally or alternatively, one table may be provided for each of multiple different respective temporal criteria (e.g., mileage or time in service). Additionally or alternatively, one table may be provided for each of multiple different respective vehicle types/models, brake system types, or other criteria.

When the remote tables of critical parameters 306, 306' and 306" get updated, vehicles to which the update is deemed applicable to the noise cancellation coordinator 300 may have the updates pushed to them (e.g., via transmission of the respective ones of the remote tables of critical parameters 306, 306' and 306"). In an example embodiment, a corresponding instance of a noise canceller at each vehicle (and therefore also a corresponding update manager) may be employed to receive the communications from the noise cancellation coordinator 300. Thus, for example, a noise canceller at each of a first vehicle 320 and a second vehicle 330 that share a first affinity association may each receive a first update message 360 from the noise cancellation coordinator 300 based on sharing a the first affinity association with the vehicle 110. The first update message 360 may include a first remote table of critical parameters 306 for updating braking torque maps at the first and second vehicles 320 and 330. Additionally or alternatively, a noise canceller at each of a third vehicle 340 and a fourth vehicle 350 that share a second affinity association may each receive a second update message 360 from the noise cancellation coordinator 300 based on sharing a the second affinity association with the vehicle 110. The second update message 370 may include a second remote table of critical parameters 306' for updating braking torque maps at the third and fourth vehicles 340 and 350.

Figure 4:
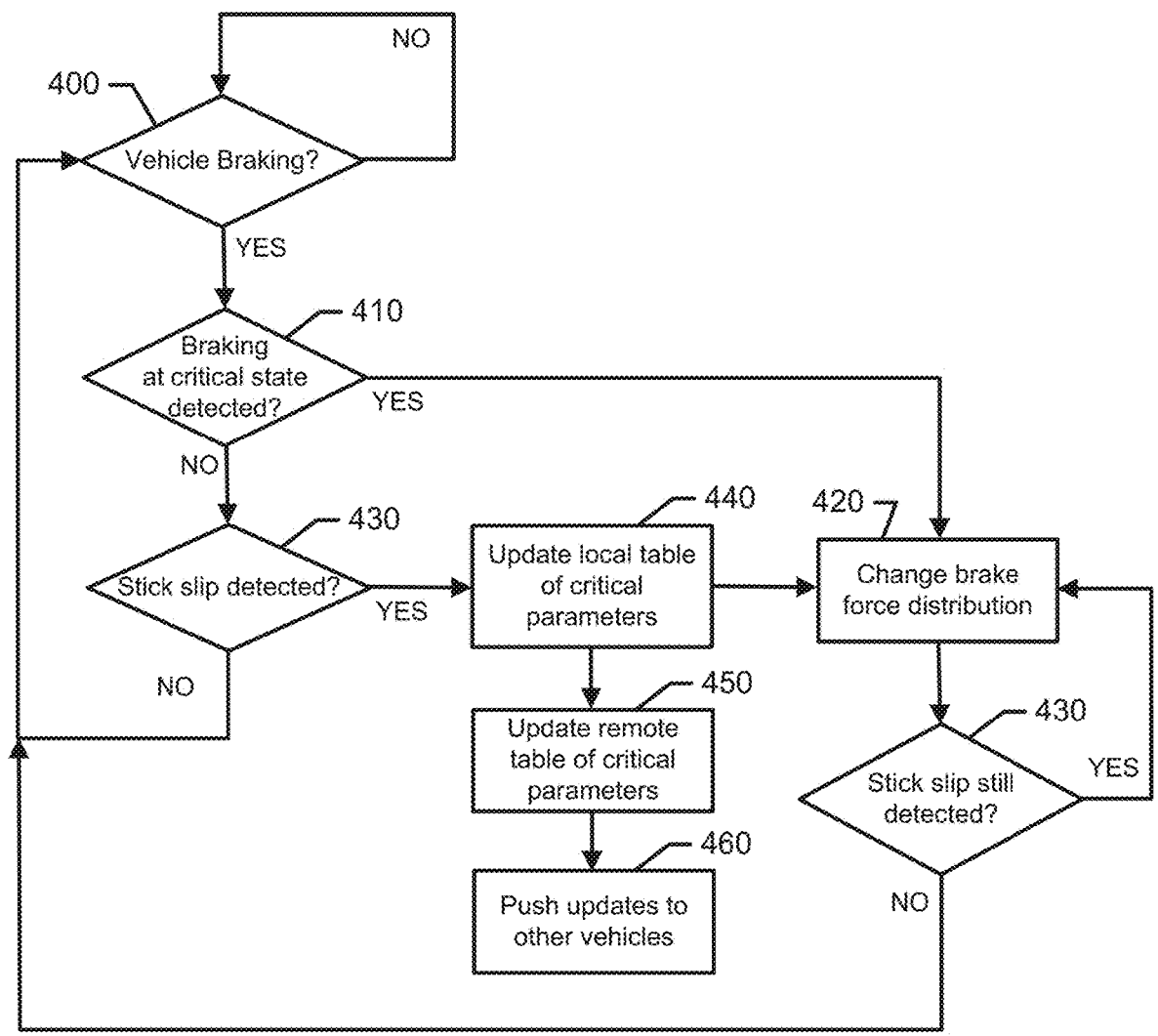
FIG. 4 illustrates a block diagram of a process or algorithm for managing critical parameter updates according to an example embodiment.

FIG. 4 illustrates a block diagram of a process or algorithm for managing critical parameter updates according to an example embodiment. Thus, for example, the control system 200 may initially monitor to determine whether the vehicle is braking at operation 400. Active braking may be determined by monitoring the brake pedal 220 (e.g., via the brake pedal position sensor 230), the braking torque 242 signal, EBM components 250, or any other suitable indicator. If no braking is detected, a loop may be executed to continue monitoring for the braking. If braking is detected at operation 400, then a further determination may be made regarding whether the braking being applied is at a critical state for brake noise generation (e.g., based on the critical ranges of braking torque values for noise generation that define the vehicle states, vehicle speed, vehicle direction, brake temperature, and/or combinations thereof that are likely to cause brake noise) at operation 410.

If braking is determined to be at a critical state for noise generation (e.g., including parameters indicating a vehicle status that includes measurements in the critical region for noise generation) in operation 410, then a change in braking force distribution may occur at operation 420. Operation 420 may act as a noise cancellation effort, by attempting to eliminate or eschew stick slip, which may involve oscillations or vibrations that generate noise. Changes in braking force distribution may be made to direct brake force or brake torque to desired values (or desired proportions) via modification of the brake force or brake torque being applied at one or more axles of the vehicle. In an example embodiment, changes in braking force distribution may, in some cases, be made such that the total amount of braking torque (or force) is maintained at the same level, but the distribution (particularly between front and rear axles or wheels) is changed. Thus, for example, if a normal braking torque distribution is such that seventy percent of the total braking torque is normally applied to the front axle and thirty percent is normally applied to the rear axle, the change initiated in operation 420 may shift that distribution to fifty percent at each of the front and rear axles while maintaining the same total amount of braking torque.

For many vehicles, analysis during vehicle development and/or characterization of the dynamic responses of the vehicle during testing may be employed to determine initial parameters for braking force or braking torque splits between front and rear axles during normal operation. Development of a strategy for subsequent changes, including potentially the ordering of such changes, may be performed as an extension of this analysis or testing. An ordering may be desired since one change may not prove to be effective in eliminating stick slip, so that it may be desirable to initiate a sequence of changes, with multiple efforts being made and checked for effectiveness. Thus, for example, the noise canceller 270 (and/or the noise cancellation coordinator 300) may include an algorithm for selecting changes to the distribution of braking forces that may be implemented at operation 420 when any one change has not proven effective. Operation 430 may therefore be employed to create a loop for ensuring an effective change in brake force distribution.

In this regard, operation 430 may include determining whether stick slip is still detected after the change in brake force distribution most recently made at operation 420. If stick slip is not detected, then the change made at operation 420 has been effective, and control flow may return to the original monitoring step at operation 400. However, if stick slip is still detected, then control flow may cycle back to operation 420 for another change in brake force distribution. In some embodiments, this cycling may be performed under control of an algorithm and may be accompanied by a counting of the number of cycles that have been made to ensure that a sequential step through an ordered listing of change options is employed. The algorithm may define an order of changing brake force distribution along with the specific force or torque splits between front and rear axles that accompany each respective change. However, random changes could alternatively be employed in some cases. The distribution change could be made directly, or via alteration of the braking torque map 244.

As noted above, the distribution change may include an alteration of the splitting of braking forces or braking torque between axles while maintaining a constant total braking force or torque. This change may involve, in some cases, only consideration of the magnitude of the real component of braking forces or torques. However, in other cases, consideration may further include imaginary components of braking forces or braking torques such that torque vectoring may be accounted for in making brake force distribution changes. Thus, other changes to the brake force distribution are also possible beyond merely just changing percentages of torque split between the front and rear axles. In this regard, more complicated compensation functions or cancellation strategies may be employed in some cases. For example, a shape or mathematical function of the stick slip may be examined. If the stick slip is, for example, in the shape of a sine function, then the change in brake force distribution may be applied according to a cosine function. In some cases, the change in brake force distribution may be applied counteracting the stick slip by brake actuator (e.g., one of the EBM components 250) movement. Thus, for example, cycling actuators or other components of the EBM components 250 according to a sine or cosine function may be employed to provide brake force distribution changes in some cases.

In an example embodiment, detection of the braking applied being in a critical state for noise generation at operation 410 is not the only way to initiate changes to brake force distribution at operation 420 in some cases. For example, stick slip may be detected as a trigger as well (e.g., via the stick slip detector 260) at operation 430. Thus, initiation of changes to brake force distribution at operation 420 may be a result of either actual detection of the occurrence of stick slip (at operation 430) or measurement of brake force or brake torque being in a critical state for noise generation (at operation 410). However, since the measurement of values associated with operation 410 is based on criteria (i.e., the values themselves) that have been defined, and since measurements of stick slip is independent of any predefined values or parameters measured, but a detection of a phenomenon actually occurring presently, the path to operation 420 via operation 430 may include an updating of the local table of critical parameters at operation 440. This updating may record the parameters measured when the stick slip phenomenon occurs, so that in case the occurrence happens at a new range of brake force or brake torque values in association with a unique context (e.g., geography, temporal context, brake temperature, vehicle speed/direction, etc.), the correspondence between the context and the occurrence may be noted. In other words, it can be recognized that stick slip has occurred outside the critical range, so that perhaps the critical range may need to be redefined (at least for the current context of the vehicle experiencing the stick slip outside the previously defined critical range). This updating may therefore be referred to as adaptive updating of the table since the table is only conditionally updated when adaptation of the table seems appropriate. The local instance of the noise canceller may then (e.g., via update manager 280) report the modification to the local table of critical parameters to the noise cancellation coordinator 300, which may update remote tables of critical parameters at operation 450, and push such updates to other vehicles at operation 460, all in the manner described in greater detail above in reference to FIG. 3.

Figure 5:
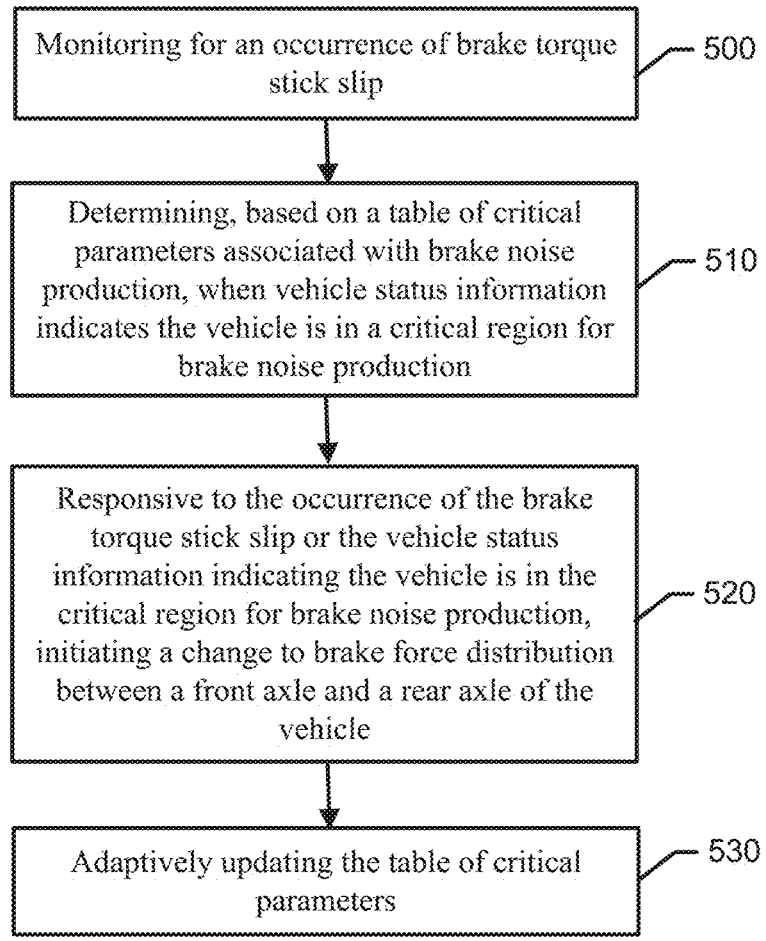
FIG. 5 illustrates a method of adaptively canceling brake system noise in a vehicle according to an example embodiment.

A method of adaptively canceling brake system noise in a vehicle is shown in the block diagram of FIG. 5, and a vehicle control system for practicing the method may therefore also be provided. The system may include a braking torque module operably coupled to one or more wheels of the vehicle to provide braking force or braking torque to the one or more wheels distributed between a front axle and a rear axle of the vehicle, and a noise canceller operably coupled to a sensor network to receive vehicle status information. The noise canceller may be configured to perform the method, which may include monitoring for an occurrence of brake torque stick slip at operation 500. The method may further include determining, based on a table of critical parameters associated with brake noise production, when vehicle status information indicates the vehicle is in a critical region for brake noise production at operation 510. The method may further include, responsive to the occurrence of the brake torque stick slip or the vehicle status information indicating the vehicle is in the critical region for brake noise production, initiating a change to brake force distribution between a front axle and a rear axle of the vehicle at operation 520, and adaptively updating the table of critical parameters at operation 530.

The method and system of some embodiments may include additional operations, features, modifications, augmentations and/or the like to achieve further objectives or enhance performance of the system. The additional operations, features, modifications, augmentations and/or the like may be added in any combination with each other. Below is a list of various additional operations, features, modifications, and augmentations that can each be added individually or in any combination with each other. For example, adaptively updating the table of critical parameters may include updating the table of critical parameters in response to the occurrence of the brake torque stick slip when the vehicle is not in the critical region. In an example embodiment, adaptively updating the table of critical parameters may include updating a local instance of the table of critical parameters at the vehicle. In some embodiments, adaptively updating the table of critical parameters may include updating a remote instance of the table of critical parameters at a location remote from the vehicle. In an example embodiment, the method may further include updating the local table of critical parameters responsive to input from the remote instance of the table of critical parameters. In some embodiments, initiating the change to brake force distribution may include changing a percentage of total braking torque that is applied to each of the front and rear axles without changing the total braking torque. In an example embodiment, initiating the change to brake force distribution may include determining a shape of a graph of a mathematical function descriptive of the brake torque stick slip at the front or rear axle and applying a force at the front or rear axle having a canceling mathematical function relative to the shape of the graph of the mathematical function. In some embodiments, when the mathematical function is a sine wave the canceling mathematical function is a cosine wave, and when the mathematical function is the cosine wave the canceling mathematical function is the sine wave. In an example embodiment, initiating the change to brake force distribution may include counteracting the brake torque stick slip by brake actuator movement. In some embodiments, initiating the change to brake force distribution may include providing a first brake force distribution change, determining whether the brake torque stick slip stops responsive to the first brake force distribution change, and initiating a second brake force distribution change if the brake torque stick slip did not stop responsive to the first brake force distribution change.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method of adaptively canceling brake system noise in a vehicle, the method comprising:
   determining, based on a table of critical parameters associated with brake noise production, when vehicle status information indicates the vehicle is in a critical region for brake noise production;
   responsive to the vehicle status information indicating the vehicle is in the critical region for brake noise production, preemptively initiating a change to brake force distribution between a front axle and a rear axle of the vehicle prior to initially monitoring for an occurrence of brake torque stick slip; and
   adaptively updating the table of critical parameters.

2. The method of claim 1, wherein adaptively updating the table of critical parameters comprises updating the table of critical parameters in response to the occurrence of the brake torque stick slip when the vehicle is not in the critical region.

3. The method of claim 2, wherein adaptively updating the table of critical parameters comprises updating a local instance of the table of critical parameters at the vehicle.

4. The method of claim 3, wherein adaptively updating the table of critical parameters comprises updating a remote instance of the table of critical parameters at a location remote from the vehicle.

5. The method of claim 4, further comprising updating the local table of critical parameters responsive to input from the remote instance of the table of critical parameters.

6. The method of claim 1, wherein initiating the change to brake force distribution comprises changing a percentage of total braking torque that is applied to each of the front and rear axles without changing the total braking torque.

7. The method of claim 1, wherein initiating the change to brake force distribution comprises determining a shape of a graph of a mathematical function descriptive of the brake torque stick slip at the front or rear axle and applying a force at the front or rear axle having a canceling mathematical function relative to the shape of the graph of the mathematical function.

8. The method of claim 7, wherein when the mathematical function is a sine wave the canceling mathematical function is a cosine wave, wherein when the mathematical function is the cosine wave the canceling mathematical function is the sine wave.

9. The method of claim 1, wherein initiating the change to brake force distribution comprises counteracting the brake torque stick slip by brake actuator movement.

10. The method of claim 1, wherein initiating the change to brake force distribution comprises providing a first brake force distribution change, determining whether the brake torque stick slip stops responsive to the first brake force distribution change, and initiating a second brake force distribution change if the brake torque stick slip did not stop responsive to the first brake force distribution change.

11. A vehicle control system comprising:
   a braking torque module operably coupled to one or more wheels of a vehicle to provide braking force or braking torque to the one or more wheels distributed between a front axle and a rear axle of the vehicle; and
   a noise canceller operably coupled to a sensor network to receive vehicle status information to:
   monitor for an occurrence of brake torque stick slip;
   determine, based on a table of critical parameters associated with brake noise production, when the vehicle status information indicates the vehicle is in a critical region for brake noise production;
   responsive initially only to the vehicle status information indicating the vehicle is in the critical region for brake noise production, initiate a change to brake force distribution between the front and rear axles of the vehicle; and
   adaptively update the table of critical parameters.

12. The vehicle control system of claim 11, wherein adaptively updating the table of critical parameters comprises updating the table of critical parameters in response to the occurrence of the brake torque stick slip when the vehicle is not in the critical region.

13. The vehicle control system of claim 12, wherein adaptively updating the table of critical parameters comprises updating a local instance of the table of critical parameters at the vehicle.

14. The vehicle control system of claim 13, wherein adaptively updating the table of critical parameters comprises updating a remote instance of the table of critical parameters at a location remote from the vehicle.

15. The vehicle control system of claim 14, wherein the noise canceller further updates the local table of critical parameters responsive to input from the remote instance of the table of critical parameters.

16. The vehicle control system of claim 11, wherein initiating the change to brake force distribution comprises changing a percentage of total braking torque that is applied to each of the front and rear axles without changing the total braking torque.

17. The vehicle control system of claim 11, wherein initiating the change to brake force distribution comprises determining a shape of a graph of a mathematical function descriptive of the brake torque stick slip at the front or rear axle and applying a force at the front or rear axle having a canceling mathematical function relative to the shape of the graph of the mathematical function.

18. The vehicle control system of claim 17, wherein when the mathematical function is a sine wave the canceling mathematical function is a cosine wave, wherein when the mathematical function is the cosine wave the canceling mathematical function is the sine wave.

19. The vehicle control system of claim 11, wherein initiating the change to brake force distribution comprises counteracting the brake torque stick slip by brake actuator movement.

20. The vehicle control system of claim 11, wherein initiating the change to brake force distribution comprises providing a first brake force distribution change, determining whether the brake torque stick slip stops responsive to the first brake force distribution change, and initiating a second brake force distribution change if the brake torque stick slip did not stop responsive to the first brake force distribution change.

\* \* \* \* \*